(12) United States Patent
Cappella et al.

(10) Patent No.: US 6,339,110 B1
(45) Date of Patent: *Jan. 15, 2002

(54) PROCESS FOR RIGID POLYURETHANE FOAMS

(75) Inventors: Andrea Cappella, Trento (IT); Werner Hoffmann, Leuven (BE); Silvio Barettini, Varese (IT); Maria Vittoria Franco, Angera (IT); Walter Bazzo, Varese (IT)

(73) Assignee: Imperial Chemical Industries PLC, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,317

(22) Filed: Jun. 10, 1997

(30) Foreign Application Priority Data

Jun. 20, 1996 (EP) .............................................. 96109939

(51) Int. Cl.⁷ .......................... C08G 18/48; C08G 18/50
(52) U.S. Cl. .................. 521/131; 521/167; 252/182.27
(58) Field of Search ................................ 521/167, 131; 252/182.27

(56) References Cited

U.S. PATENT DOCUMENTS

| | | | |
|---|---|---|---|
| 4,410,641 A | 10/1983 | Narayan et al. | 521/167 |
| 4,469,822 A | 9/1984 | Stolz et al. | 521/167 |
| 4,496,625 A | 1/1985 | Snider et al. | 428/318.4 |
| 4,562,290 A | 12/1985 | Korczak et al. | 564/399 |
| 5,091,438 A | * 2/1992 | Tairaka et al. | 521/175 |
| 5,096,933 A | 3/1992 | Volkert | 521/131 |
| 5,444,101 A | 8/1995 | De Vos et al. | 521/131 |
| 5,523,332 A | 6/1996 | Fishback et al. | 521/115 |
| 5,523,333 A | 6/1996 | Fishback et al. | 521/131 |
| 5,525,641 A | 6/1996 | White, III et al. | 521/131 |
| 5,602,190 A | 2/1997 | Lamberts et al. | 521/131 |

FOREIGN PATENT DOCUMENTS

| | | |
|---|---|---|
| CA | 2119479 | 9/1994 |
| CA | 2161065 | 4/1996 |
| CA | 2178576 | 12/1996 |
| WO | 96/23017 | 8/1996 |
| WO | WO 97/21765 | 6/1997 |

OTHER PUBLICATIONS

Yoshimura, H., Tamano, Y., and Okuzono, S., "An Insight into the Characteristics of a Nucleation Catalyst in CFC–Free Rigid Foam Systems", *Proceedings SPI*, 1994, p. 300.

* cited by examiner

*Primary Examiner*—Rachel Gorr
(74) *Attorney, Agent, or Firm*—Pillsbury Winthrop LLP

(57) ABSTRACT

Process for the preparation of a rigid polyurethane or urethane-modified polyisocyanurate foam in the presence of a hydrocarbon blowing agent using a tolylenediamine-initiated polyether polyol in an amount of between 10 and 40% by weight based on total isocyanate-reactive compounds.

16 Claims, No Drawings

PROCESS FOR RIGID POLYURETHANE FOAMS

This invention relates to processes for the preparation of rigid polyurethane or urethane-modified polyisocyanurate foams, to foams prepared thereby, and to novel compositions useful in the process.

Rigid polyurethane and urethane-modified polyisocyanurate foams are in general prepared by reacting the appropriate polyisocyanate and isocyanate-reactive compound (usually a polyol) in the presence of a blowing agent. One use of such foams is as a thermal insulation medium as for example in the construction of refrigerated storage devices. The thermal insulating properties of rigid foams are dependent upon a number of factors including, for closed cell rigid foams, the cell size and the thermal conductivity of the contents of the cells.

A class of materials which has been widely used as blowing agent in the production of polyurethane and urethane-modified polyisocyanurate foams are the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop reaction systems in which chlorofluorocarbon blowing agents are replaced by alternative materials which are environmentally acceptable and which also produce foams having the necessary properties for the many applications in which they are used.

A class of materials which have been used as alternative blowing agents with zero ozone depletion potential are hydrocarbons especially alkanes and cycloalkanes such as isobutane, n-pentane, isopentane, cyclopentane and mixtures thereof. However thermal insulation properties of hydrocarbon blown rigid polyurethane foams are not satisfactory. Another disadvantage of hydrocarbon blowing agents is their limited solubility in the standard isocyanate-reactive compositions.

It is an object of the present invention to provide hydrocarbon blown rigid polyurethane or urethane-modified polyisocyanurate foams having improved thermal insulation properties.

It is another object of the present invention to provide a process for making hydrocarbon blown rigid polyurethane or urethane-modified polyisocyanurate foams whereby the solubility of the blowing agent in the isocyanate-reactive composition is improved.

These objects are met by using in the process of making rigid polyurethane or urethane-modified polyisocyanurate foams from polyisocyanates and isocyanate-reactive components in the presence of hydrocarbons as blowing agent a tolylenediamine(TDA)-initiated polyether polyol in an amount of between 10 and 40% by weight based on the total isocyanate-reactive compounds.

Foams prepared by the process of the present invention show better thermal insulation than foams from the prior art prepared not using tolylenediamine (TDA)-initiated polyether polyols. Further the solubility of hydrocarbon blowing agents in the isocyanate-reactive composition is improved by using TDA-initiated polyether polyols.

Aromatic amine initiated polyether polyols such as TDA-initiated polyether polyols and diaminodiphenylmethane or polymethylene polyphenylene polyamine (DADPM)-initiated polyether polyols have been described as suitable isocyanate-reactive compounds for hydrocarbon blown rigid polyurethane foams (see, for example, EP 421269, WO 94/25514, EP 708127, U.S. Pat. Nos. 5,523,333, 5,523,332, 5,523,334 and EP 617068). None of these prior art documents suggests an improvement in thermal insulation properties or in hydrocarbon solubility by using TDA-initiated polyether polyols instead of DADPM-initiated polyether polyols. WO 96/23017 and EP 747411 (both citable under Article 54(3) EPC) describe the use of TDA-initiated polyols in hydrocarbon blown rigid polyurethane foams in an amount of at least 40% by weight based on total polyols.

The TDA-initiated polyether polyols for use in the present invention are obtained by the addition of alkylene oxides, such as ethylene oxide and/or propylene oxide to one or more of the various isomers of tolylene diamine such as 2,4-, 2,6-, 2,3- and 3,4-TDA. Preferably 2,3- and/or 3,4-TDA (ortho-TDA or vicinal TDA) is used as initiator with up to 25 wt % of total initiator of meta-TDA (2,4- and/or 2,6-TDA). Vicinal TDA is a pure isomer or mixture thereof, preferably containing 20 to 80 wt % 2,3-TDA and 80 to 20 wt % 3,4-TDA. Other co-initiators can be used additionally in an amount up to 60% by weight of total initiator, preferably between 5 and 10% by weight. In a preferred embodiment aliphatic amines are not used as co-initiator.

The alkylene oxides used are preferably 0 to 90% ethylene oxide, more preferably 20 to 80% ethylene oxide and 100 to 10%, preferably 80 to 20% propylene oxide.

The TDA-initiated polyether polyols for use in the present invention generally have OH numbers in the range 200 to 700, preferably 250 to 550 mg KOH/g, more preferably between 350 and 520 mg KOH/g and have functionalities in the range 2 to 8, preferably 3 to 6. The molecular weight is generally between 400 and 700.

Tolylene diamine initiated polyether polyols and methods for their preparation are fully described in the prior art, for example, in U.S. Pat. Nos. 4,243,759, 5,141,968, 4,391,728, 4,421,871, 4,562,290, 4,469,822, 4,397,966, DD 272307, DD 251151, DD 290202 and DD 290201.

A preferred TDA-initiated polyether polyol for use in the present invention is a polyether polyol of OH value 300 to 400 mg KOH/g, obtained by reacting o-TDA (containing up to 25 wt % of m-TDA) with propylene oxide. The amount of TDA-initiated polyol is preferably between 10 and 39% by weight based on the total isocyanate-reactive compounds, more preferably between 10 and 35% by weight, most preferably between 20 and 33% by weight.

In the case of blowing with solely cyclopentane as hydrocarbon the amount of TDA-initiated polyether polyol is preferably below 35% by weight, more preferably below 30% by weight, most preferably below 25% by weight based on total isocyanate-reactive compounds.

The hydrocarbon blowing agents for use in the present invention are preferably (cyclo)alkanes, preferably containing from 3 to 8 carbon atoms, such as cyclopentane, isopentane, n-pentane, neopentane, n-butane, cyclobutane, methylcyclobutane, isobutane, propane, cyclopropane, methylcyclopropane, n-hexane, 3-methylpentane, 2-methylpentane, cyclohexane, methylcyclopentane, n-heptane, 2-methylheptane, 3-ethylpentane, 2,2,3-trimethylbutane, 2,2-dimethylpentane, cycloheptane, methylcyclohexane, 2,2-dimethylbutane and 2,3-dimethylbutane. Particularly preferred hydrocarbons are the C5 and C6 (cyclo)alkanes such as cyclopentane, n-pentane and isopentane, and any mixtures thereof and mixtures of any of these with isobutane.

A preferred blowing agent is a mixture of isopentane and n-pentane in a weight ratio of between 75:25 and 25:75, most preferably at a ratio 8/3. Another preferred blowing agent is a mixture of cyclopentane and isopentane and/or n-pentane in a weight ratio cyclopentane:n/isopentane of between 80:20 and 20:80, preferably 60:40 wherein the weight ratio npentane:isopentane is preferably between 0:100 and 50:50.

Suitable isocyanate-reactive compounds which may be employed in admixture with the TDA-initiated polyether polyols include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, the various isomers of phenylene diamine, 4-chloro-o-phenylenediamine, 4-chloro-m-phenylenediamine, 4,5-dichloro-o-phenylenediamine, 4,5-dimethyl-o-phenylenediamine, 4-methoxy-o-phenylenediamine, 2-nitro-p-phenylenediamine, 4-4'-methylenebis(o-chloroaniline), 4,4'-methylenebis(3-nitroaniline), 3,3'-diaminobenzidine, 1,5-diaminonaphthalene, diaminodiphenylmethane, polymethylene polyphenylene polyamines; and aminoalcohols, for example ethanolamine and diethanolamine; and mixtures of such initiators. In a preferred embodiment of the present invention aliphatic amine initiated polyether polyols are not used, in particular when cyclopentane is used as blowing agent. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

In a preferred embodiment of the present invention the TDA-initiated polyether polyol is used together with other polyether polyols and up to 20 wt % (based on total polyols) of polyester polyols. The hydroxyl value of the polyol blend is generally between 350 and 550 mg KOH/g, more preferably between 380 and 430 mg KOH/g.

Preferably the TDA-initiated polyether polyol is used together with other aromatic amine initiated polyether polyols so that the total amount of aromatic amine initiated polyether polyols is between 40 and 100%, preferably between 50 and 90%, most preferably between 60 and 70% by weight based on total polyols. Preferred aromatic amine initiated polyether polyols to be used together with the TDA-initiated polyether polyol of the present invention are DADPM-initiated polyether polyols.

Preferred non aromatic amine initiated polyether polyols which can be used in the process of the present invention include sucrose and/or sorbitol-initiated polyether polyol.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

In addition to the hydrocarbon blowing agent(s) other physical blowing agents may be used in amounts up to 20 mole % of the total physical blowing agents present.

Suitable other physical blowing agents include those well known and described in the art, for example dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Generally water or other carbon dioxide-evolving compounds are used together with the physical blowing agents. Where water is used as chemical co-blowing agent typical amounts are in the range from 0.2 to 5%, preferably from 0.5 to 3% by weight based on the isocyanate-reactive compound.

The total quantity of blowing agent to be used in a reaction system for producing cellular polymeric materials will be readily determined by those skilled in the art, but will typically be from 2 to 25% by weight based on the total reaction system.

In order to reduce the cell sizes of the foam and accordingly to improve the thermal insulation properties an insoluble fluorinated compound may be used in the foam-forming process according to the present invention. Such insoluble fluorinated compounds include any of those disclosed in U.S. Pat. Nos. 4,981,879, 5,034,424, 4,792,002, EP 508649 and WO 95/18176. Certain of said insoluble fluorinated compounds suitable for use in the process of the invention may themselves act as blowing agents under the conditions pertaining to the foam-forming reaction, particularly where their boiling point is lower than the exotherm temperature achieved by the reaction mixture.

In addition to the polyisocyanate and polyfunctional isocyanate-reactive compositions and the blowing agent, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, fire retardants, for example halogenated alkyl phosphates such as tris chloropropyl phosphate, and fillers such as carbon black.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in pre-blended formulations based on each of the primary polyisocyanate and isocyanate-reactive components. In particular, many reaction systems employ a polyisocyanate-reactive composition which contains the major additives such as the blowing agent and the catalyst in addition to the polyisocyanate-reactive component or components.

Therefore the present invention also provides a polyisocyanate-reactive composition comprising (a) hydrocarbon blowing agent(s) and a TDA-initiated polyether polyol in an amount of between 10 and 40% by weight based on total isocyanate-reactive compounds.

The various aspects of this invention are illustrated, but not limited by the following examples.

The following formulation and reaction components are referred to in the examples:

Polyol 1: a sorbitol initiated polyether polyol of OH value 460 mg KOH/g.

Polyol 2: a sorbitol initiated polyether polyol of OH value 420 mg KOH/g.

Polyol 3: a DADPM initiated polyether polyol of OH value 310 mg KOH/g.

Polyol 4: a TDA initiated polyether polyol of OH value 350 mg KOH/g.

Surfactant: a silicone surfactant.

Catalyst: a mixture of amine catalysts.

SUPRASEC DNR: a polymeric MDI available from Imperial Chemical Industries.

SUPRASEC is a trademark of Imperial Chemical Industries.

EXAMPLE 1

Rigid polyurethane foams were prepared from the ingredients listed in Table 1.

The initial thermal conductivity at 10° C. (lambda value) of the obtained foams was measured according to standard ASTM C 518.

The results are given in Table 1.

These results show that by adding TDA initiated polyether polyols to rigid polyurethane foam systems blown with n-pentane/isopentane mixtures thermal insulation properties are improved.

TABLE 1

|  |  | Foam Ref. | Foam No. 1 | Foam No. 2 | Foam No. 3 |
|---|---|---|---|---|---|
| Polyol 1 | pbw | 38.0 | 38.0 | 38.0 | 33.0 |
| Polyol 2 | pbw | 25.9 | 15.0 |  |  |
| Polyol 3 | pbw | 27.2 | 10.0 | 25.0 | 25.0 |
| Polyol 4 | pbw |  | 30.0 | 30.0 | 35.0 |
| Surfactant | pbw | 2.0 | 2.0 | 2.0 | 2.0 |
| Catalyst | pbw | 3.6 | 3.6 | 3.6 | 3.6 |
| water | pbw | 2.0 | 2.0 | 2.0 | 2.0 |
| isopentane | pbw | 8.0 | 8.0 | 8.0 | 8.0 |
| n-pentane | pbw | 3.0 | 3.0 | 3.0 | 3.0 |
| SUPRASEC DNR | pbw | 139.2 | 132.5 | 137.5 | 135.9 |
| Index | % | 116 | 116 | 116 | 116 |
| Lambda initial | mW/mK | 21.9 | 21.3 | 21.3 | 21.1 |

EXAMPLE 2

Rigid polyurethane foams were prepared from the ingredients listed in Table 2.

The initial thermal conductivity at 10° C. (lambda value) of the obtained foams was measured according to standard ASTM C 518.

The results are given in Table 2.

TABLE 2

|  |  | Foam Ref. | Foam No. 4 |
|---|---|---|---|
| Polyol blend |  |  |  |
| Polyol 1 | pbw | 38.0 | 33.0 |
| Polyol 2 | pbw | 25.9 | 25.9 |
| Polyol 3 | pbw | 27.2 |  |
| Polyol 4 | pbw |  | 32.2 |
| Surfactant | pbw | 2.0 | 2.0 |
| Catalyst | pbw | 3.6 | 3.6 |
| water | pbw | 1.8 | 1.8 |
| isopentane | pbw | 9.0 | 9.0 |
| n-pentane | pbw | 4.0 | 4.9 |
| SUPRASEC DNR | pbw | 132 | 132 |
| Index | % | 116 | 116 |
| Lambda initial | mW/mK | 21.9 | 21.3 |

The polyol blend of the reference foam containing the hydrocarbon blowing agent, DADPM-initiated polyether polyol and no TDA-initiated polyether polyol is not stable; phase separation takes place. Replacing the DADPM-initiated polyether polyol of the reference foam by TDA-initiated polyether polyol (Foam No. 4) improves the solubility of the hydrocarbon blowing agent in the polyol blend; the blend is stable.

EXAMPLE 3

Polyol blends consisting of 95 g basic polyol as identified in Table 3 below, 1 g of amine catalyst, 2 g of silicone surfactant and 2 g of water were made. Cyclopentane was added to this polyol blends until a phase separation was detected. This quantity of cyclopentane was designated as the limiting concentration for the solubility in the respective polyol mixture.

The following basic polyols were used:

Polyol A being a DADPM initiated polyether polyol of hydroxyl value 500 mg KOH/g;

Polyol B being a o-TDA initiated polyether polyol of hydroxyl value 350 mg KOH/g.

The solubility (expressed in grams) of cyclopentane in polyol blends containing these specific basic polyols is represented in table 3 below.

TABLE 3

| Basic polyol | Solubility cyclopentane |
|---|---|
| Polyol A | 13 |
| Polyol B | >30 |

These results show that the solubility of hydrocarbon blowing agents in polyol blends is improved when the blends contain tda initiated polyether polyols instead of DADPM initiated polyether polyols.

What is claimed is:

1. A process for preparing rigid polyurethane or urethane-modified polyisocyanurate foams comprising the step of reacting an organic polyisocyanate composition with a polyfunctional isocyanate-reactive composition in the presence of a hydrocarbon blowing agent, wherein said polyfunctional isocyanate-reactive composition comprises a tolylenediamine-initiated polyether polyol in an amount of between 20 and 40% by weight based on total isocyanate-reactive components, wherein the tolylenediamine-initiated polyether polyol optionally contains co-initiators in an amount up to 10% by weight based on total initiator, and wherein other aromatic amine initiated polyether polyols are present and the total amount of aromatic amine initiated polyether polyols is between 40 and 100 wt % relative to total isocyanate-reactive components.

2. Process according to claim 1 wherein the amount of tolylenediamine-initiated polyether polyol is between 20 and 35% by weight based on total isocyanate-reactive components.

3. Process according to claim 1 wherein the tolylenediamine-initiated polyether polyol is obtained by the addition of ethylene and/or propylene oxides to ortho-tolylenediamine containing up to 25 wt % of total initiator of meta-tolylenediamine.

4. Process according to claim 1 wherein the tolylenediamine-initiated polyether polyol has an OH value in the range 200 to 700 mg KOH/g and a functionality in the range 2 to 8.

5. Process according to claim 1 wherein the hydrocarbon blowing agent is an alkane or a cycloalkane containing from 3 to 8 carbon atoms.

6. Process according to claim 5 wherein the hydrocarbon blowing agent is isobutane, cyclopentane, n-pentane, isopentane or any mixture thereof.

7. Process according to claim 6 wherein the blowing agent is a mixture of isopentane and n-pentane in a weight ratio of between 3:1 and 1:3.

8. Process according to claim 1 wherein the isocyanate-reactive composition does not comprise aliphatic amine initiated polyether polyols.

9. Process according to claim 1 wherein the hydroxyl value of the isocyanate-reactive composition is between 350 and 550 mg KOH/g.

10. Process according to claim 1 wherein the isocyanate-reactive composition further comprises a diaminodiphenylmethane or polymethylene polyphenylene polyamine initiated polyether polyol.

11. Rigid polyurethane or urethane-modified polyisocyanurate foams prepared by the process as defined in claim 1.

12. A polyfunctional isocyanate-reactive composition comprising a hydrocarbon blowing agent and, relative to the total amount of isocyanate-reactive components, 20–40% by weight of tolylenediamine-initiated polyether polyol(s), wherein the tolylenediamine-initiated polyol(s) optionally contain co-initiators in an amount up to 10% by weight based on total initiator, and wherein other aromatic amine initiated polyether polyols are present and the total amount of aromatic amine initiated polyether polyols is between 40 and 100 wt % relative to total isocyanate-reactive components.

13. Composition according to claim 12 having a hydroxyl value of between 350 and 550 mg KOH/g.

14. Composition according to claim 12 comprising a diaminodiphenylmethane or polymethylene polyphenylene polyamine initiated polyether polyol.

15. Composition according to claim 12 wherein the hydrocarbon blowing agent is a mixture of n-pentane and isopentane.

16. The composition of claim 12, wherein said hydrocarbon blowing agent is cyclopentane.

* * * * *